United States Patent
Hickernell

(10) Patent No.: US 11,433,969 B2
(45) Date of Patent: Sep. 6, 2022

(54) BIOMECHANICAL CYCLING PEDAL

(71) Applicant: William Ryan Hickernell, Richland, PA (US)

(72) Inventor: William Ryan Hickernell, Richland, PA (US)

(*) Notice: Subject to any disclaimer, the term of this patent is extended or adjusted under 35 U.S.C. 154(b) by 0 days.

(21) Appl. No.: 16/868,515

(22) Filed: May 6, 2020

(65) Prior Publication Data
US 2021/0347438 A1  Nov. 11, 2021
US 2022/0169334 A9  Jun. 2, 2022

Related U.S. Application Data

(60) Provisional application No. 62/843,621, filed on May 6, 2019.

(51) Int. Cl.
*B62M 3/08* (2006.01)

(52) U.S. Cl.
CPC ................................ *B62M 3/08* (2013.01)

(58) Field of Classification Search
CPC ............................... B62M 3/08; B62M 3/086
See application file for complete search history.

(56) References Cited

U.S. PATENT DOCUMENTS

| 2011/0041648 A1* | 2/2011 | van Eijk | B62M 3/08 74/594.4 |
| 2012/0060646 A1* | 3/2012 | Arnold | B62M 3/08 74/594.4 |

FOREIGN PATENT DOCUMENTS

FR   2661651 A1 * 11/1991   ............. B62M 3/08

* cited by examiner

*Primary Examiner* — Patrick Cicchino

(57) ABSTRACT

A cycling pedal assembly consisting of a body configured to spin, slide, and pivot on a horizontal rotational axis formed by an axle, roller bearing, and spherical rolling joint.

13 Claims, 8 Drawing Sheets

BIOMECHANICAL CYCLING PEDAL

BACKGROUND OF THE INVENTION

1. Field of the Invention

An assembly that relates to cycling equipment, specifically, a biomechanical pedal.

2. Additional Information

Cycling pedals have evolved from simple counterbalanced brass sleeves, as illustrated in the first U.S. patent issued for improving velocipedes, to ball-bearing mounted pedal bodies with rubber treads or narrow cage plates. To further the pedal's usefulness, clip retention systems that allowed for a pull stroke during a crank rotation were incorporated into the pedal body. The first clip systems were simple wire cages and straps that surrounded the cyclist's shoe—similar to clip systems used today.

It was not until the 1980s, when the commercially successful one-sided clipless road-bike pedal with a broad contact area pedal body and locking-binding mechanism was invented, that most cyclists in the class—whether recreational riders or professional racers—began to use a clipless pedal. The specialized shoe required for use with the locking-binding mechanism is not adapted well for walking; an interchangeable, large three-bolt cleat positioned on the shoe's outsole is used to determine whether the shoe floats—where and how far—or remains fixed.

Several years later, the commercially successful two-sided clipless pedal with small contact area plates and open-locking mechanism was invented. The specialized shoe required for use with the open-locking mechanism is adapted for walking, with multiple positioning locations in the shoe's midsole for a small, recessed two-bolt cleat that floats on a bolt plate.

A desired characteristic of a broad contact area pedal body is power transfer across a wide area of the shoe, which prevents painful hotspots typical of a small contact area pedal. An undesired characteristic of a broad contact area clipless pedal body is friction resistance, affecting how easily the shoe floats when applying pressure to the pedal body throughout a crank rotation. As a result, a broad contact area clipless pedal body floats less effectively than a small contact area clipless pedal body.

Considering the above, there is a need for a broad contact area pedal body that pivots in a limited left and right range of movement—rather than floats—to better prevent injuries commonly incurred from powering a crankset. The present embodiment of the biomechanical pedal, hereinafter the pedal, addresses this need for the prior art, and from this disclosure, it will become apparent to those skilled in the art.

SUMMARY OF THE INVENTION

An assembly including a horizontal rotational axis consisting of a body configured to spin & pivot on a spherical rolling joint mounted on the second end of an axle and spin & slide on a roller bearing mounted on the first end of an axle.

An object of the present embodiment is to provide a pedal with a body that pivots without translation on an XY-axis according to a cyclist's progressive toe orientation throughout a crank rotation.

Thus, several features of the pedal have been broadly outlined so the detailed description may be clearly understood and the contribution to the art better appreciated. Additional features of the art are described herein to form the subject matter of the claims appended hereto. The pedal is not limited in its application to the details of construction and arrangements of the components outlined in the specifications or illustrated in the drawings. The pedal is capable of other embodiments and being practiced and carried out in various ways.

BRIEF DESCRIPTION OF THE DRAWING

Referring to the attached drawings that are part of this disclosure.

DETAILED DESCRIPTION OF THE PREFERRED EMBODIMENTS

Figure 1:
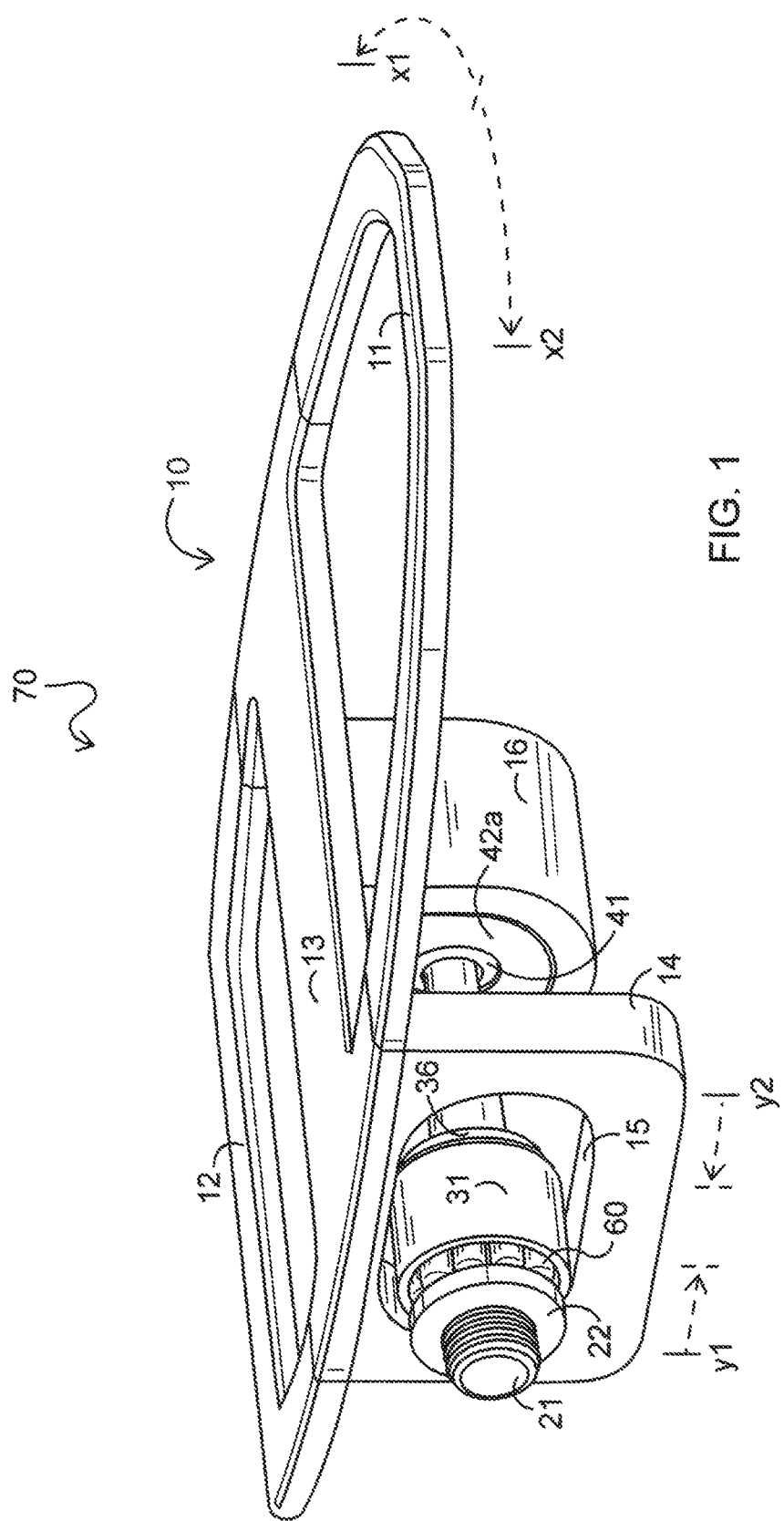
FIG. 1 is a perspective view of a left biomechanical pedal assembly, an x1-left & x2-right direction of movement indicator, and y1-forward & y2-rearward range of movement indicator.
Figure 2:
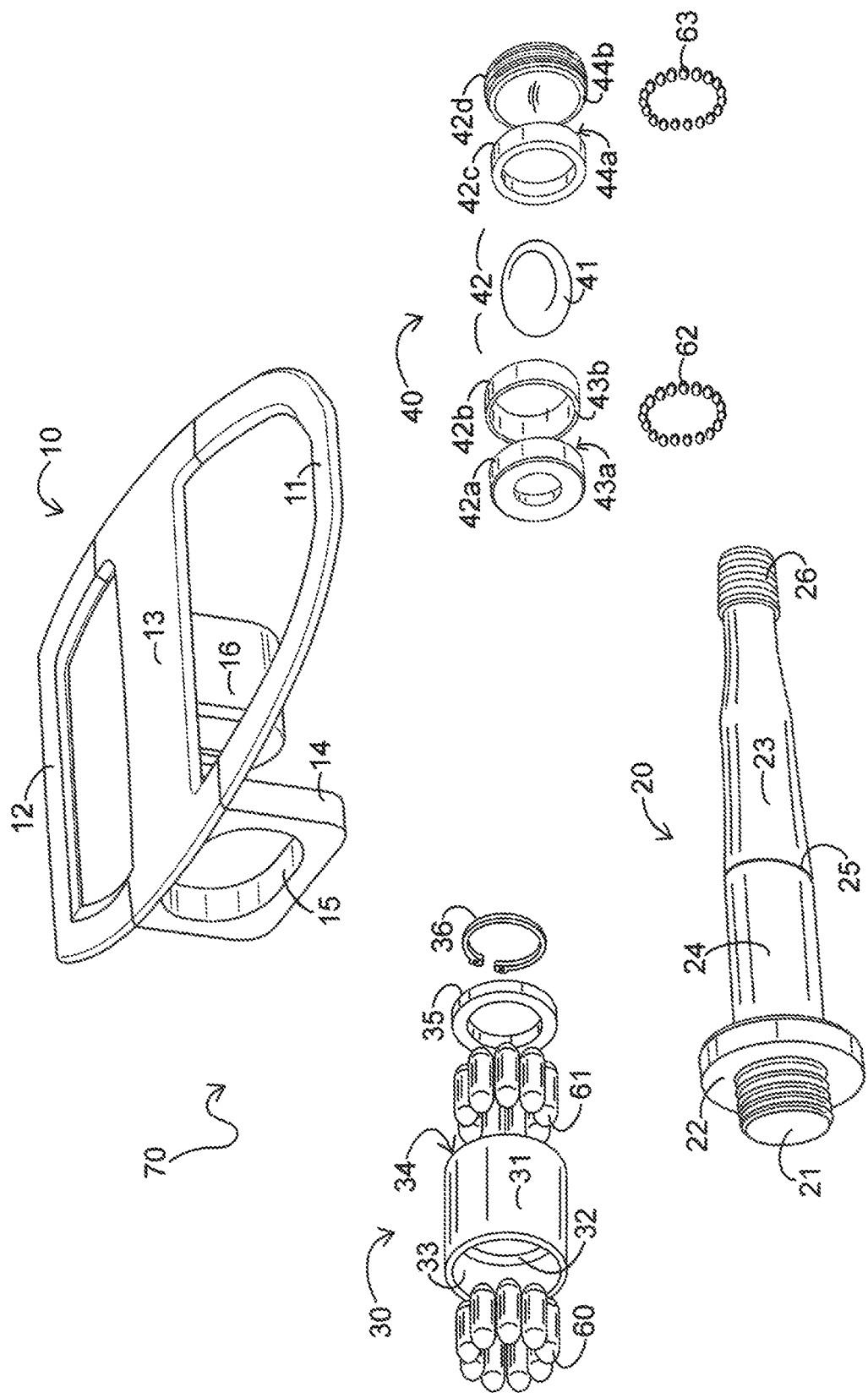
FIG. 2 is an exploded view of the pedal.

The drawings in FIGS. 1-2, illustrate a pedal 70, including a body 10, axle 20, roller bearing 30, and spherical rolling joint 40.

The body 10 seen in FIG. 1 is a rigid structure likely to be made from a lightweight metal alloy, carbon fiber, or resin that can withstand the combined axial and radial loads a cyclist creates during a crank rotation and impact event. The body 10 is configured with a forward rail 11 and rear rail 12 connected by a tread 13. Together, the rails 11-12 and tread 13 form a broad contact area 11-13 for the cyclist's shoe.

Figure 3:
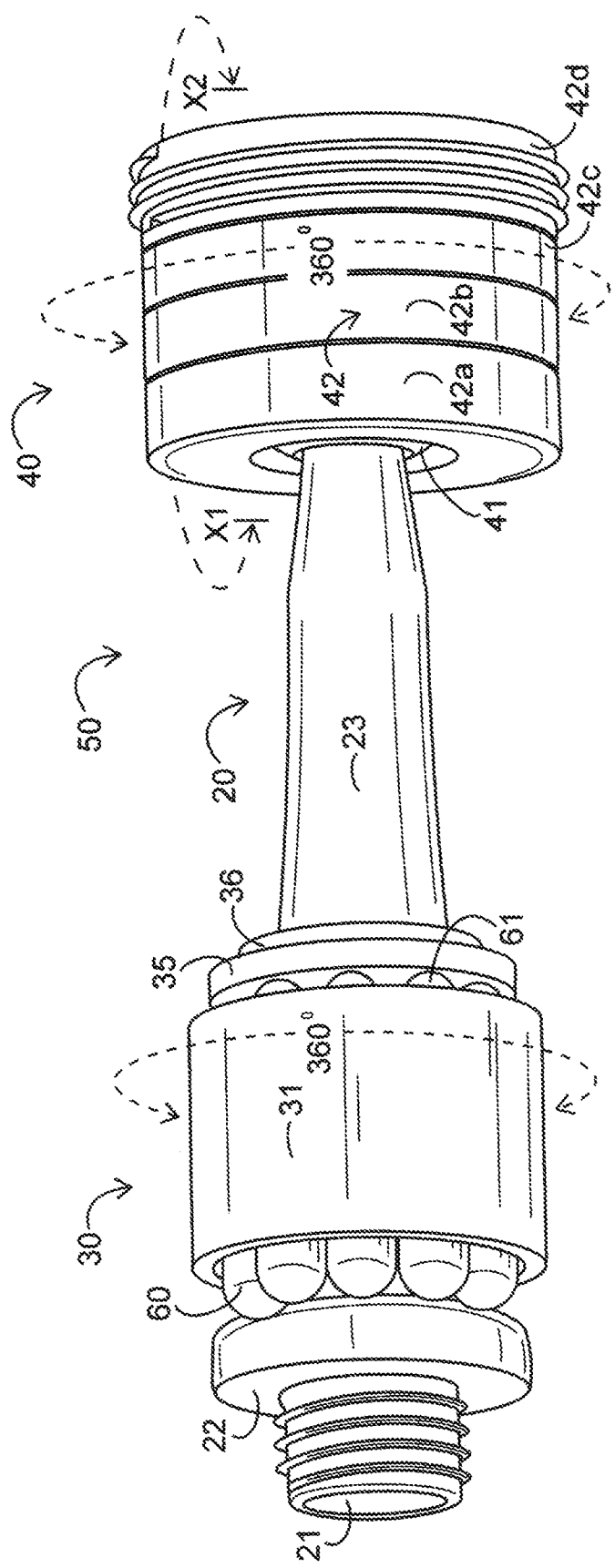
FIG. 3 is a side view of the horizontal rotational axis consisting of an axle, roller bearing, and spherical rolling joint.

The spherical rolling joint housing 16 seen in FIG. 1 is attached by known means to the bottom of the tread 13 and rotatably connects the body 10 to the axle shaft 23 by enclosing the spherical rolling joint 40 seen in FIG. 3, inside the spherical rolling joint housing 16 seen in FIG. 1. The XY-axis marker seen in FIGS. 5-8 identifies the location of the spherical inner race 41 in relation to the contact area 11-13 and the point where the body 10 pivots on the horizontal rotational axis 50 formed by the axle 20, roller bearing 30, and spherical rolling joint 40 seen in FIG. 3.

The bearing bracket 14 seen in FIGS. 1-2, is attached by known means to the first end of the tread 13 to movably link the body 10 to the horizontal rotational axis 50 by encircling the roller bearing 30 seen in FIG. 1. A clearance between the elongated-circle shape racetrack 15 and partitioned outer race 31 allows the bearing bracket 14 to slide y1-forward & y2-rearward without friction resistance on the roller bearing 30 when the body 10 pivots in the x1-left & x2-right direction of movement on the XY-axis. The y1-forward & y2-rearward range of movement the bearing bracket 14 can slide on the roller bearing 30 is determined by the fixed vertical positioning of the bearing bracket 14 on the tread 13 and the length of the racetrack 15 seen in FIGS. 1-2.

Figure 5:
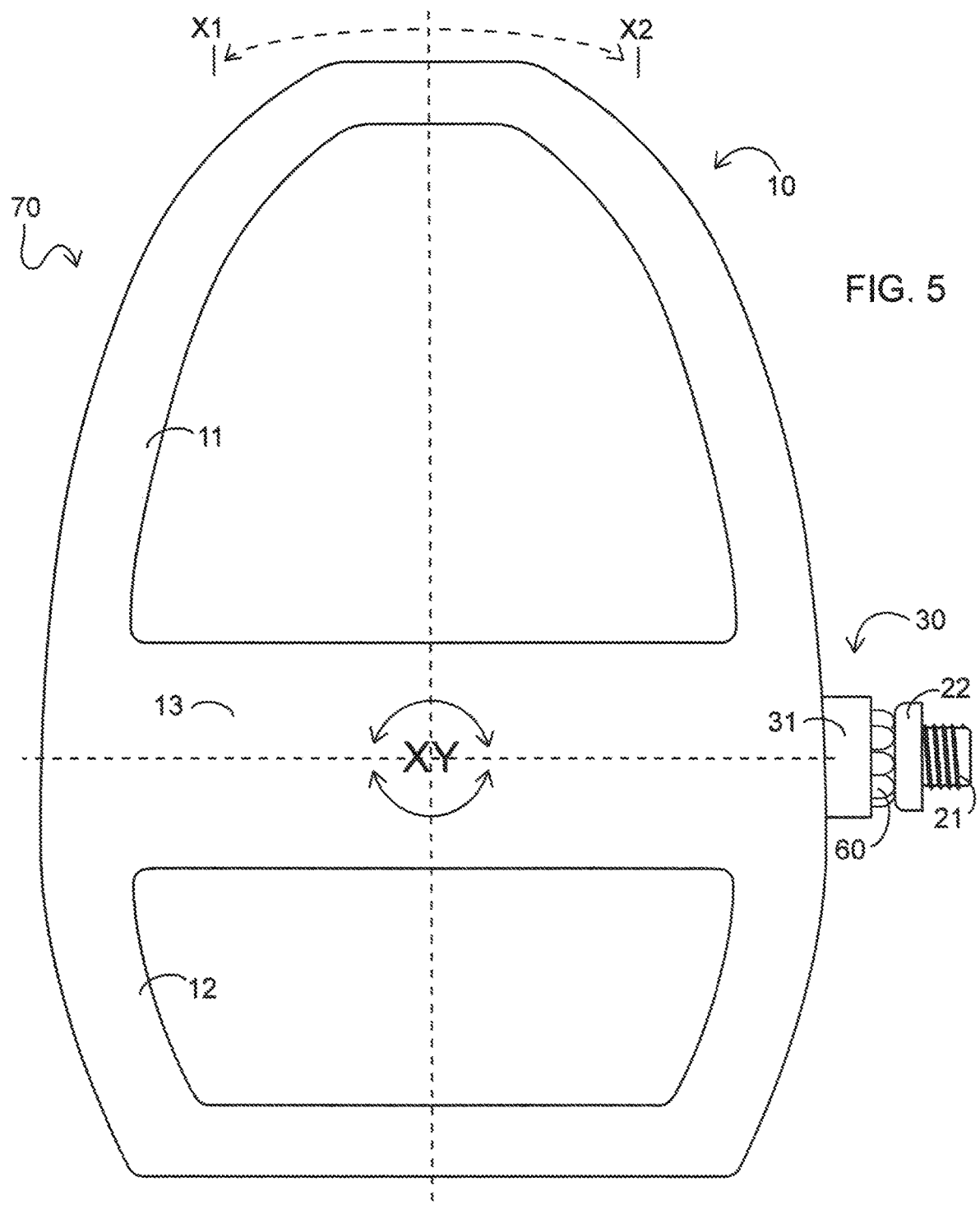
FIG. 5 is a top view of the pedal with an XY-axis marker.
Figure 6:
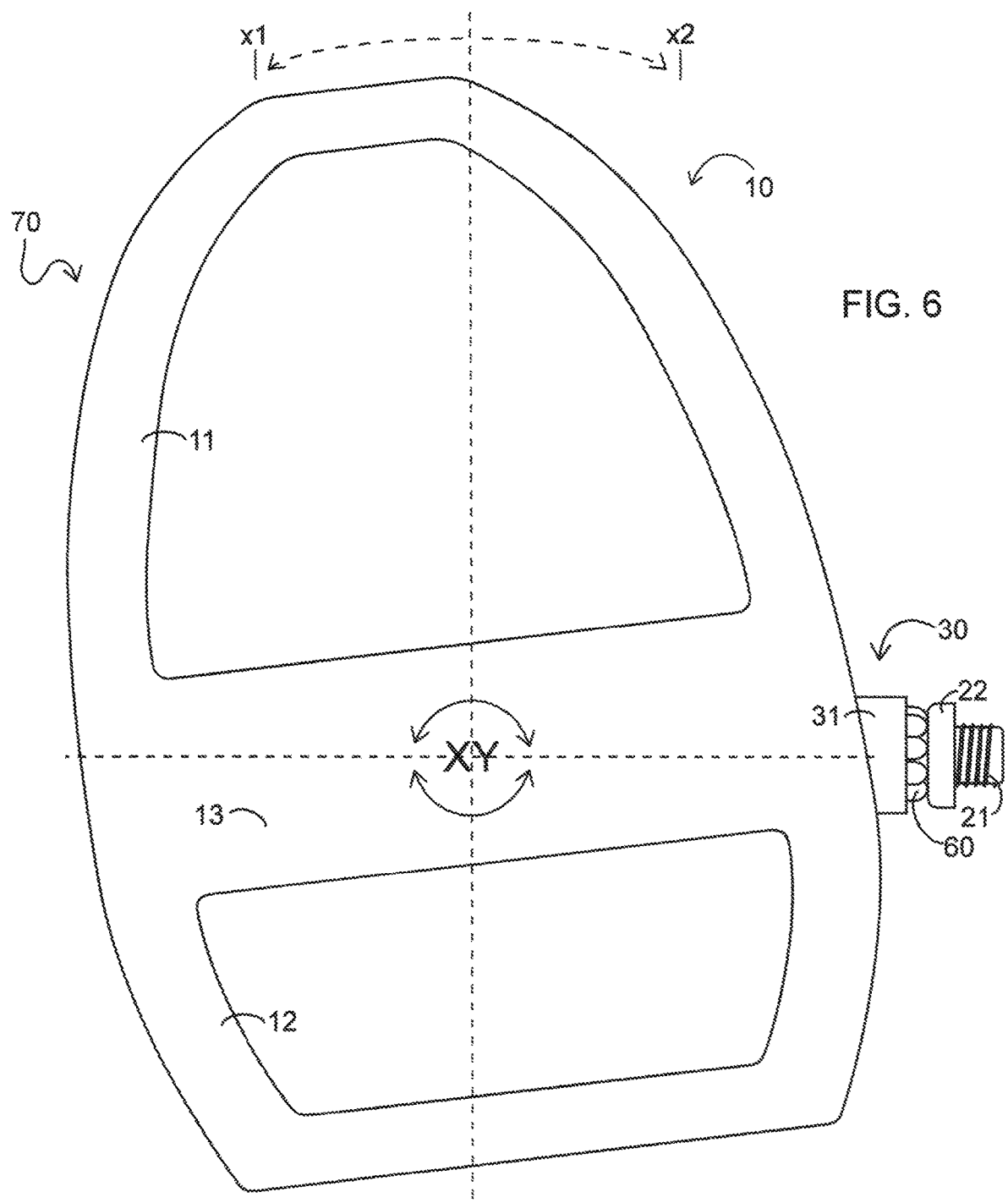
FIG. 6 is a top view of the pedal with the body pivoted in the x1-left direction.
Figure 7:
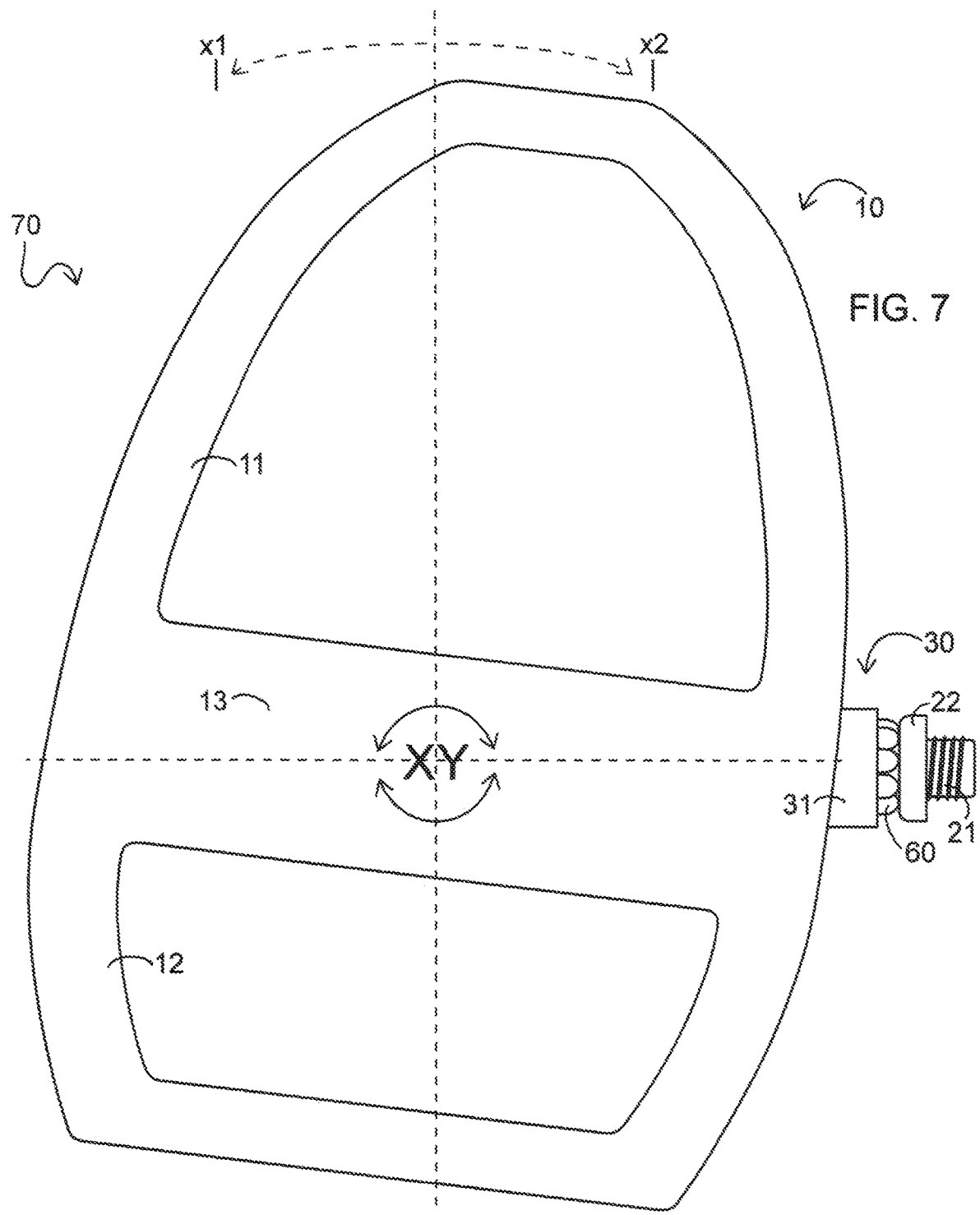
FIG. 7 is a top view of the pedal with the body pivoted in the x2-right direction.
Figure 8:
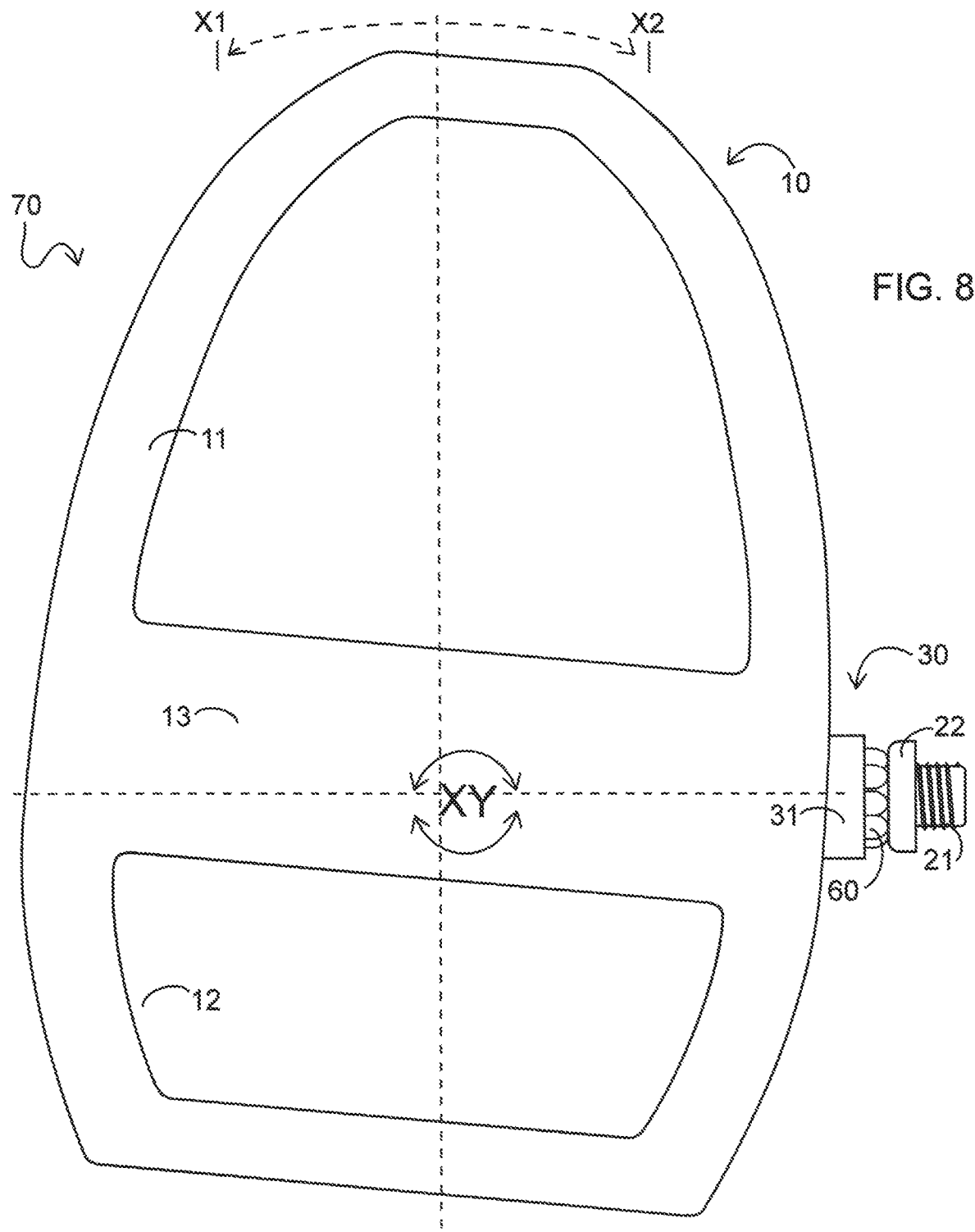
FIG. 8 is a top view of the pedal with the XY-axis offset from the tread's 13 horizontal and vertical centers.

The pedal 70 can be configured to distinctively pivot by aligning the contact area's 11-13 horizontal and vertical centerlines seen in FIGS. 5-8 to a cyclist's standing toe orientation with a desired y1-forward & y2-rearward range of movement. Typical in-toe & out-toe orientations can be accommodated by positioning the spherical rolling joint housing 16 on the tread's 13 horizontal and vertical centers to locate the XY-axis on the tread's 13 horizontal and vertical centers, as seen in FIGS. 5-7, with the bearing bracket 14 positioned vertical center over the roller bearing 30. Non-typical in-toe & out-toe orientations can be accommodated by positioning the spherical rolling joint housing 16 left or right of the tread's 13 horizontal center and forward or rearward of the tread's 13 vertical center to locate the XY-axis offset from the tread's 13 horizontal and vertical centers, as seen in FIG. 8, with the bearing bracket 14 positioned forward or rearward of vertical center over the roller bearing 30.

Figure 4:
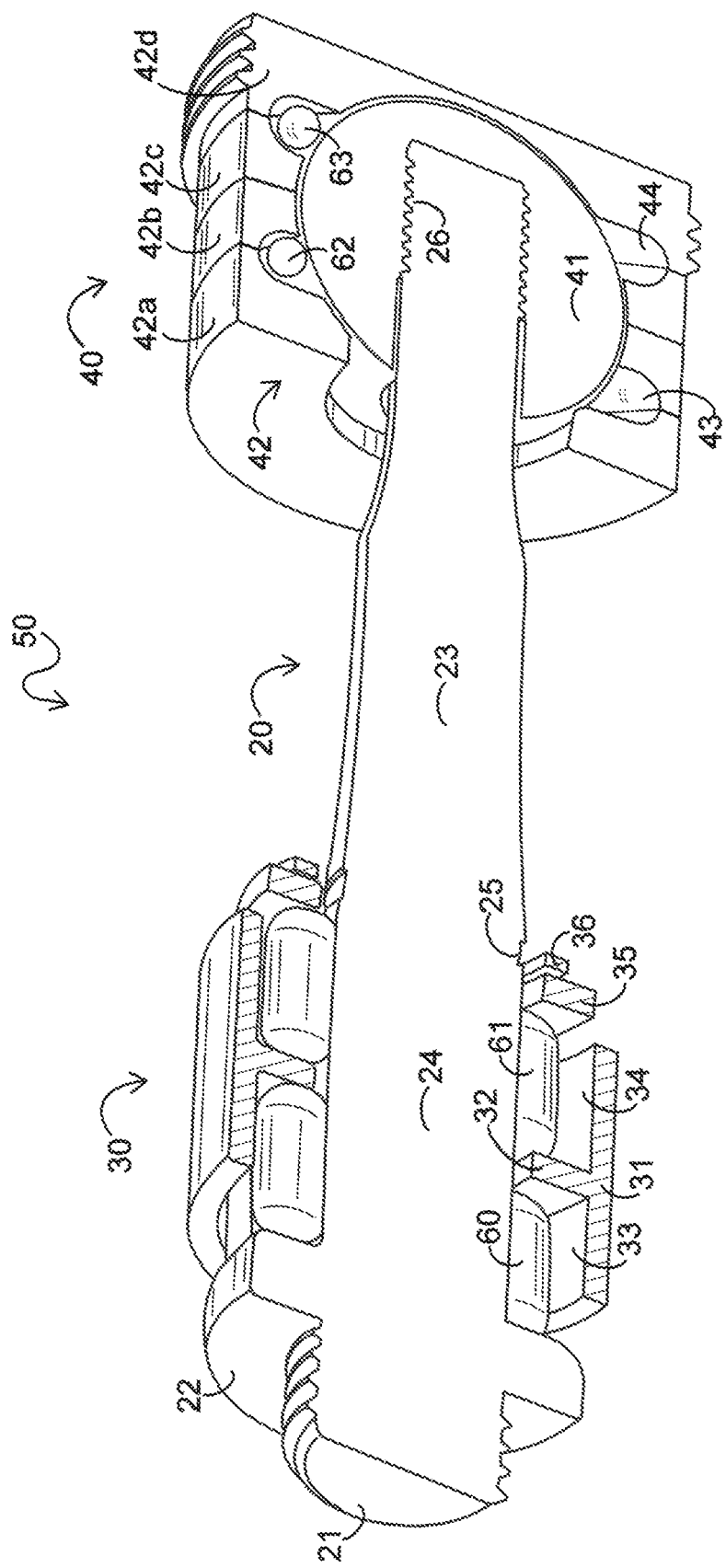
FIG. 4 is a cross-sectional view of the horizontal rotational axis.

The axle 20 seen in FIG. 2 is a high strength, high stiffness, metal alloy structure with an externally threaded crank bolt 21 and bolt head 22 for turning the axle 20 into a crank arm. The second end of the bolt head 22 seen in FIG. 4 is used to retain the roller bearing's 30 first row of cylindrical-bearings 60. Adjacent to the second end of the bolt head 22 seen in FIG. 2 is an axle shaft 23 with a first end having a polished axle inner race 24 and snap ring groove 25. Located on the second end of the axle shaft 23 is the externally threaded spherical inner race bolt 26.

The roller bearing 30 seen in FIG. 2-4 is a multi-piece bearing including a partitioned outer race 31, first row of cylindrical-bearings 60, second row of cylindrical-bearings 61, race washer 35, and snap ring 36. The roller bearing's 30 components are likely to be made from a lightweight metal alloy able to withstand bearing wear.

As seen in FIG. 4, the partitioned outer race 31 has a bore partition 32 used to form a first cylindrical bearing groove 33 and a second cylindrical-bearing groove 34. The first row of cylindrical-bearings 60 and second row of cylindrical-bearings 61 seen in FIG. 4 support the partition outer race 31 when under a radial load and withstanding an axial load. The first row of cylindrical-bearings 60 is retained between the bolt head 22 and the first end of the bore partition 32; and the second row of cylindrical-bearings 61 is retained between the second end of the bore partition 32 and the race washer 35 seen in FIG. 3.

When assembled, the roller bearing 30 is retained to the axle shaft 23 via the snap ring 36 seen in FIG. 3, which clips into the snap ring groove 25 located on the second end of the axle inner race 24. As seen in FIG. 4, the first row of cylindrical-bearings 60 and second row of cylindrical-bearings 61 roll on the axle inner race 24 to eliminate the need for an additional inner race required in a sealed cartridge bearing.

The spherical rolling joint 40 seen in FIGS. 2-4 is a multi-piece rolling joint including a spherical inner race 41, cylindrical outer race 42, first row of ball-bearings 62, and second row of ball-bearings 63. The spherical rolling joint's 40 components are likely to be made from a lightweight metal alloy able to withstand bearing wear.

The cylindrical outer race 42 seen in FIG. 3 is formed from four individual cylindrical outer race rings 42a-42b. As seen in FIG. 2, the circular holes in the middle of rings 42a-42c are used to horizontally stack rings 42a-42d around the spherical inner race 41 seen in FIG. 4. Ring 42d seen in FIG. 2, has a concave center and external threads for turning ring 42d into an internally threaded spherical rolling joint housing 16 to compress rings 42a-42c and rotatably attach the body 10 to the axle shaft 23. The first ball-bearing groove 43 and second ball-bearing groove 44 are formed by pairing rings 42a-42d—each with half a ball-bearing groove—together. As seen in FIG. 4, the first ball-bearing groove 43 is formed when ring 42a with half-bearing groove 43a is paired with ring 42b having half-bearing groove 43b; and the second ball-bearing groove 44 is formed when ring 42c with half-bearing groove 44a is paired with ring 42d having half-bearing groove 44b. The first row of ball-bearings 62 and second row of ball-bearings 63 seen in FIG. 4 are used to form the friction-reducing clearance between the spherical inner race 41 and cylindrical outer race 42.

The spherical inner race 41 is likely to be made from a lightweight metal alloy able to withstand bearing wear. By means of a screw slot or polygon socket, the internally threaded spherical inner race 41 turns onto the externally threaded spherical inner race bolt 26 seen in FIG. 2. When attached to the axle shaft 23, as seen in FIG. 4, the spherical inner race 41 is stationary and prohibits lateral movement when the body 10 pivots on the XY-axis.

In accordance with a first alternate embodiment of the pedal 70, the body 10 can be adapted to accommodate a clip retention system by attaching a toe-clip to the forward rail 11.

In accordance with a second alternate embodiment of the pedal 70, the body 10 can be adapted to accommodate a clipless retention system by mounting a locking-binding mechanism to the rear rail 12.

In accordance with a third alternate embodiment of the pedal 70, the roller bearing 30 can be replaced with a crowned or uncrowned sealed cartridge bearing.

In accordance with a fourth alternate embodiment of the pedal 70, cylindrical outer race rings 42a-42d can be fused by known means to form a single cylindrical outer race 42 around the spherical inner race 41 with a first ball-bearing groove 43 having a retained first row of ball-bearings 62, and a second ball-bearing groove 44 having a retained second row of ball-bearings 63. A screw slot or polygon socket located on the second end of the spherical inner race 41 can be accessed via a hole in the middle of ring 42d. The body can be rotatably attached to the axle shaft 23 by means of a detachable spherical rolling joint housing 16 that encases the cylindrical outer race 42.

In accordance with a fifth alternate embodiment of the pedal 70, cylindrical outer race rings 42a-42b can be fused to form a first cylindrical outer race ring with a first ball-bearing groove 43 having a retained first row of retained ball-bearings 62; and rings 42c-42d can be fused to form a second cylindrical outer race ring with a second ball-bearing groove 44 having a retained second row of ball-bearings 63. The first and second cylindrical outer race rings can be encased in a detachable spherical rolling joint housing 16 or compressed in an internally threaded spherical rolling joint housing 16 by means of an externally threaded second cylindrical outer race ring.

In accordance with a sixth alternate embodiment of the pedal 70, a lubrication seal seated in a gland located in the first end bore of ring 42a can seal ring 42a and the spherical inner race 41, retain lubrication, and prevent contamination from debris. A second lubrication seal seated in a gland located on the second end of ring 42a can seal ring 42a and ring 42b. A third lubrication seal seated in a gland located on the second end of ring 42b can seal ring 42b and ring 42c. A fourth lubrication seal seated in a gland located on the second end of ring 42c can seal ring 42c and ring 42d.

In accordance with a seventh alternate embodiment of the pedal 70, a horizontal rotational axis 50 configured with a spherical rolling joint 40 mounted on the first end of the axle shaft 23 and a roller bearing 30 retained to the second end of the axle shaft 23, can accommodate a cyclist's anatomical preference for an XY-axis located on the first end of the axle shaft 23. A barrier race formed in the first end of the axle shaft 23 can retain the roller bearing's 30 first row of cylindrical-bearings 60 and a snap ring 36 can retain the second row of cylindrical-bearings 61.

While only select embodiments have been chosen to illustrate the pedal 70, various changes and modifications can be made without departing from the scope of the invention as defined in the appended claims.

What is claimed is:

1. A bicycle pedal including:
   an axle comprising:
      a crank bolt with a bolt head, where the bolt head has a second end;
      a shaft with a first end proximate the crank bolt, to mounting a bearing;
      the shaft with a second end, attaching a spherical race;
   a body comprising:
      a contact area with a tread with a first end, forward rail, and rear rail;
      a bracket fixed to the tread to link the body to the bearing;
      a housing fixed to the tread to attach the body to a spherical rolling joint; and
   wherein the bracket and housing are positioned about the tread to receive a horizontal rotational axis; and
   the bracket is positioned right of the housing;
   the bearing having an outer race separated from an inner race by rolling elements;
   the spherical rolling joint having an outer race separated from an inner race by rolling elements;
   wherein the body spins on the spherical rolling joint and bearing, and when pivoting on the spherical rolling joint, the body slides on the bearing.

2. A bicycle pedal in accordance with claim 1, wherein the body pivots on the spherical rolling joint, according to a cyclist's progressive toe orientation throughout a crank rotation.

3. A bicycle pedal in accordance with claim 1, wherein a threaded bolt positioned about the second end of the shaft is used to attach an internally threaded spherical race to the shaft.

4. A bicycle pedal in accordance with claim 1, wherein a spherical rolling joint housing attached to the tread, encases the cylindrical race to rotatably attach the body to the axle shaft.

5. A bicycle pedal in accordance with claim 1, wherein the housing is positioned on the tread's horizontal and vertical centers, and the bracket is positioned approximate the tread's first end vertical center to align the contact area's horizontal centerline at 90° from the axle shaft.

6. A bicycle pedal in accordance with claim 1, wherein the housing is positioned offset from the tread's horizontal and vertical centers, and the bracket is positioned offset from the tread's vertical center to align the contact area's horizontal centerline at an angle that is greater than or less than 90° from the axle shaft, according to the cyclist's standing in-toe or out-toe orientation.

7. A bicycle pedal in accordance with claim 1, wherein the body pivots about the spherical rolling joint, where a left, right, or combined left and right range of movement is determined by an inside length and fixed vertical positioning of the bracket about the tread, relative to the vertical center of the bearing.

8. A bicycle pedal in accordance with claim 1, wherein the inside height of the bracket is greater than a diameter of the bearing's outer race such that the body slides on the bearing, without friction resistance.

9. A bicycle pedal in accordance with claim 1, where a partition in a bore of the bearing's outer race is used to form a first bearing groove and a second bearing groove, wherein the partition is braced between a first row of rolling elements and a second row of rolling elements to form the bearing that supports radial and axial loads.

10. A bicycle pedal in accordance with claim 1, wherein the shaft acts as the inner race of the bearing and supports the rolling elements thereby reducing the bore diameter of the bearing's partitioned outer race.

11. A bicycle pedal in accordance with claim 1, wherein the spherical rolling joint comprises multiple race rings to form a cylindrical race with multiple rolling element grooves, where a rolling element groove is formed in a bore of the cylindrical race by pairing two rings, each with half a rolling element groove, together to form a complete rolling element groove.

12. A bicycle pedal in accordance with claim 11, where four race rings are fused to form a single cylindrical race with a first rolling element groove having a first row of retained rolling elements and a second rolling element groove having a second row of retained rolling elements, to separate the cylindrical race and spherical race.

13. A bicycle pedal in accordance with claim 11, where race rings one and two are fused to form a first cylindrical race ring with a first rolling element groove having a first row of retained rolling elements, and race rings three and four are fused to form a second cylindrical race with a second rolling element groove having a second row of retained rolling elements, to separate the cylindrical race and spherical race.

* * * * *